(12) United States Patent
Venkatasubramanian et al.

(10) Patent No.: US 9,009,172 B2
(45) Date of Patent: Apr. 14, 2015

(54) METHODS, SYSTEMS AND COMPUTER READABLE MEDIA FOR COMPARING XML DOCUMENTS

(75) Inventors: Ganapathy Raman Venkatasubramanian, Chennai (IN); Sriram Hariharasubramanian, Chennai (IN); Saravanan Sakthivel, Tiruvannamalai (IN); Anantasrinivas Lakshmanan, Chennai (IN); Bhuvanalakshmi Kadapakkam Nandabalan, Chennai (IN)

(73) Assignee: Infosys Limited, Bangalore (IN)

( * ) Notice: Subject to any disclaimer, the term of this patent is extended or adjusted under 35 U.S.C. 154(b) by 485 days.

(21) Appl. No.: 13/533,045

(22) Filed: Jun. 26, 2012

(65) Prior Publication Data

US 2013/0238639 A1    Sep. 12, 2013

(30) Foreign Application Priority Data

Mar. 9, 2012    (IN) .............................. 897/CHE/2012

(51) Int. Cl.
  *G06F 7/00*    (2006.01)
  *G06F 17/30*    (2006.01)
(52) U.S. Cl.
  CPC ................................ *G06F 17/30911* (2013.01)
(58) Field of Classification Search
  CPC .......... G06F 17/2247; G06F 17/30424; G06F 17/30923; G06F 8/51; G06F 17/2705; G06F 17/30961; G06F 17/218; G06F 17/272; G06F 17/2745; G06F 17/30336; G06F 17/30905; G06F 17/30908
  See application file for complete search history.

(56) References Cited

U.S. PATENT DOCUMENTS

| 6,502,112 | B1* | 12/2002 | Baisley ......................... 715/210 |
| 2002/0038319 | A1* | 3/2002 | Yahagi ........................ 707/513 |
| 2003/0120686 | A1* | 6/2003 | Kim et al. ..................... 707/200 |
| 2004/0205509 | A1 | 10/2004 | Lou |
| 2005/0039117 | A1* | 2/2005 | Lwo ............................. 715/513 |
| 2007/0005632 | A1* | 1/2007 | Stefani et al. ................. 707/102 |
| 2009/0006944 | A1 | 1/2009 | Dang et al. |
| 2009/0089658 | A1 | 4/2009 | Chiu et al. |
| 2010/0083099 | A1* | 4/2010 | Shanmugam et al. ........ 715/234 |
| 2010/0306273 | A1* | 12/2010 | Branigan et al. .............. 707/802 |
| 2011/0252310 | A1* | 10/2011 | Rahaman et al. ............. 715/255 |

OTHER PUBLICATIONS

Lu et al., "A Parallel Approach to XML Parsing," Computer Science Department, Indiana University, pp. 223-230, 7th IEEE/ACM International Conference on Grid Computing, 2006.

* cited by examiner

*Primary Examiner* — Debbie Le
*Assistant Examiner* — Hasanul Mobin
(74) *Attorney, Agent, or Firm* — LeClairRyan, a Professional Corporation

(57) ABSTRACT

The present invention provides a method and system for comparing a first XML document with a second XML document. An XML event is parsed from the first XML document or the second XML document based on a plurality of parameters. The parsed XML event is stored as a node in a first data structure or a second data structure, and compared with one or more nodes stored in the second data structure or the first structure, respectively. A comparison result is outputted, when the one or more nodes is a comparable node of the stored node, and on outputting the comparison result the comparable node and the stored node are deleted from the first data structures and the second data structures. Aforementioned steps are repeated till the first XML document and the second XML document are completely parsed and compared.

39 Claims, 8 Drawing Sheets

METHODS, SYSTEMS AND COMPUTER READABLE MEDIA FOR COMPARING XML DOCUMENTS

CROSS-REFERENCE TO RELATED APPLICATIONS

This application claims the benefit of Indian Patent Application Filing No. 897/CHE/2012, filed Mar. 9, 2012, which is hereby incorporated by reference in its entirety.

FIELD

The present invention relates generally to a method and system of data comparison in a computer environment. More specifically, the present invention relates to a method and system for comparing two XML documents.

BACKGROUND

XML (eXtensible Markup Language) is a standard language used for sharing and storing information across different technology systems. XML uses a plurality of tags to markup or describe content. XML allows data to be linked to each of the plurality of tags thereby enabling manipulation and extraction of data of comparison purpose. A typical XML document contains a tree based data structure that stores data in a structured format. Conventional techniques of comparing XML documents include parsing, loading the XML document in the form of a collection data structure such as a tree or a hash, in a memory and subsequently performing multiple traversals over the collection data structure that is materialized into the memory. A typical drawback that results in loading the collection data structure of the whole XML document into the memory is the limited scalability of the application. Further, size of the collection data structure and hence size of the XML document that can be processed in-memory gets limited by the memory available. As a result conducting in-memory processing for XML documents involving a large amount of data is usually not affordable. Further, in cases where the XML document is smaller in size, materialization of the entire XML document in the memory results in inefficient resource allocation. Furthermore multiple traversals through the collection data structures, requires additional processing capacity and time.

Alternatively, certain algorithms for comparing two XML documents as known in the art, cause one of the XML documents to be parsed entirely into a tree based data structure and the tree based data structure is loaded into a memory. The other XML document is then parsed multiple times to identify the differences between the two XML documents. Parsing an XML document multiple times, results in excessive consumption of time, as the size of the XML document increases. Hence while comparing XML documents of larger sizes, the known techniques in art, fall short with respect to, efficient utilization of memory and processing capacity.

Hence, there is a need for an alternative method and system for comparing XML documents by providing significant performance gains in terms of memory utilization and processing power. The alternative method must provide significant performance gains when comparing XML documents of larger size in order to enable machines with inferior processing power and memory to compare XML document of larger sizes. Thus a method for parallel parsing and materializing a portion of the XML documents into the memory is proposed.

SUMMARY

The present invention provides a method and system for comparing a first XML document with a second XML document. In accordance with a disclosed embodiment, the method may include parsing an XML event from one of the first XML document and the second XML document based on a plurality of parameters. The parsed XML event is stored as a node in one of a first data structure and a second data structure, when the XML event is parsed from one of the first XML document and the second XML document respectively. The stored node of the parsed XML event is compared with one or more nodes stored in one of the second data structure and the first structure respectively. A comparison result is outputted, when the one or more nodes is a comparable node of the stored node. On outputting the comparison result, each node outputted in the comparison result is deleted from the first data structure and the second data structure as applicable. Deleting an outputted node from one of the first data structure and the second data structure ensures minimum utilization of memory resources, thereby enhancing the efficiency of the method. Aforementioned steps of parsing, storing, comparing, outputting and deleting are repeated in any order till the first XML document and the second XML document are completely parsed and compared.

In an additional embodiment, a system for comparing a first XML document with a second XML document is disclosed. The system comprises a parser module, configured to parse an XML event from the first XML document and the second XML document based on a XML event indicator. The parsed XML event is stored as a node by a memory module, in one of a first data structure and a second data structure respectively. A comparator module is configured to compare the stored node with one or more nodes stored in one of the second data structure and the first data structure based on a plurality of parameters. Further a reporter module is configured to output a comparison result, when the one or more nodes are a comparable node of the stored node. On outputting the comparison result, a processing module, is configured to delete each node outputted in the comparison result from the first data structure and the second data structure as applicable. The plurality of parameters including the XML event indicator, are set by a parameter module, one processing any one step of parsing, storing, comparing, outputting and deleting. A decision module is configured to repeat at least one of the aforementioned steps, and a step of setting the XML event indicator, in each iteration, until the first XML document and the second XML document are parsed completely.

These and other features, aspects, and advantages of the present invention will be better understood with reference to the following description and claims.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed.

Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-program products for comparing a first XML document with a second XML document. The methods disclosed herein, incorporate a parse-parse-compare logic, wherein two XML documents are compared while parsing the two XML documents in parallel. A typical parse-parse-logic shall follow a sequence that includes, parsing a XML tag from the first XML document, pausing the parsing of the first XML document, parsing a XML tag from the second XML document, pausing the parsing of the second XML document and comparing the parsed XML tags. The parse-parse-compare logic is repeated for each XML tag of the first XML document and the second XML document respectively.

Figure 1:
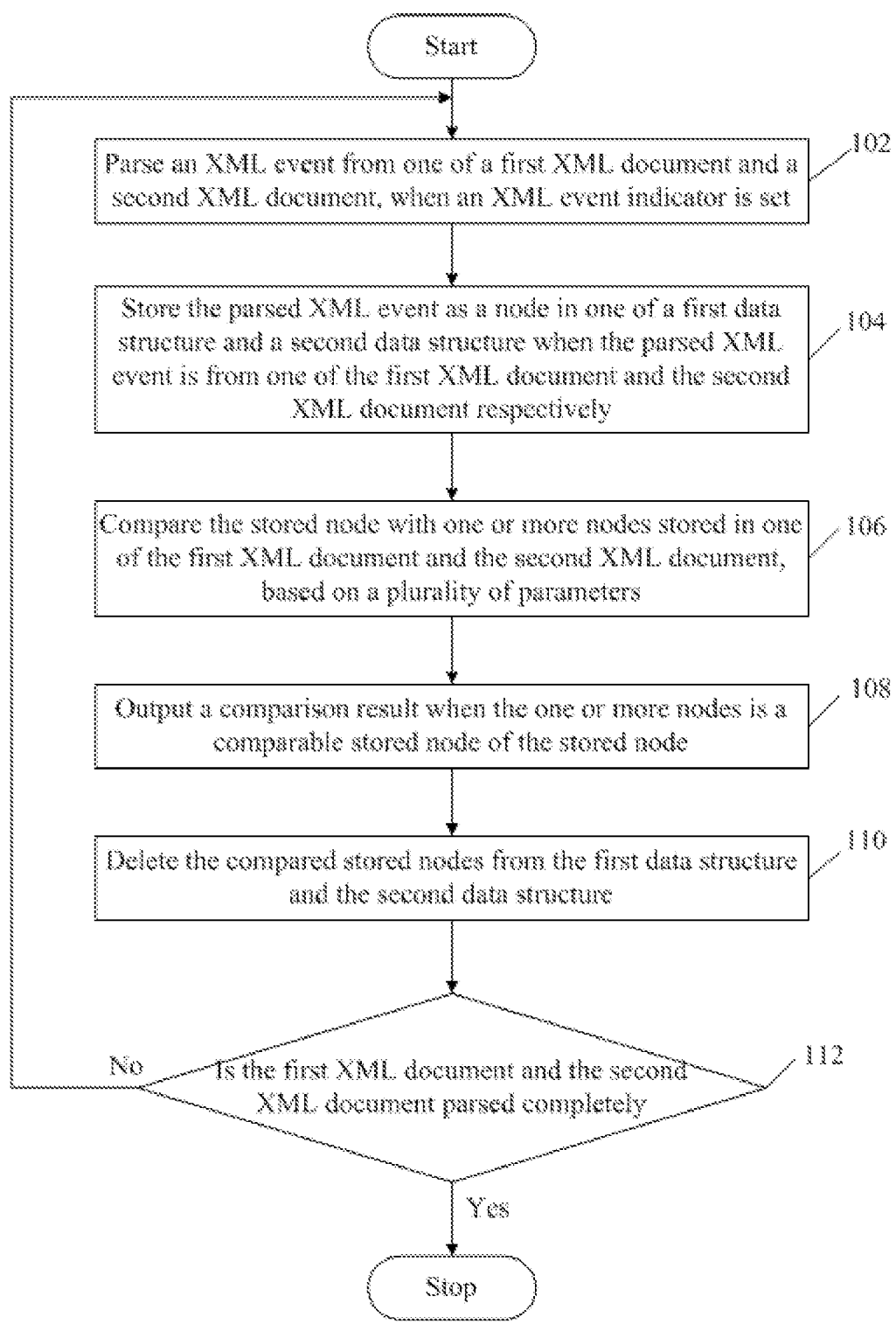
FIG. 1 is a flowchart illustrating an embodiment of a method of comparing a first XML document with a second XML document.
Figure 2A:
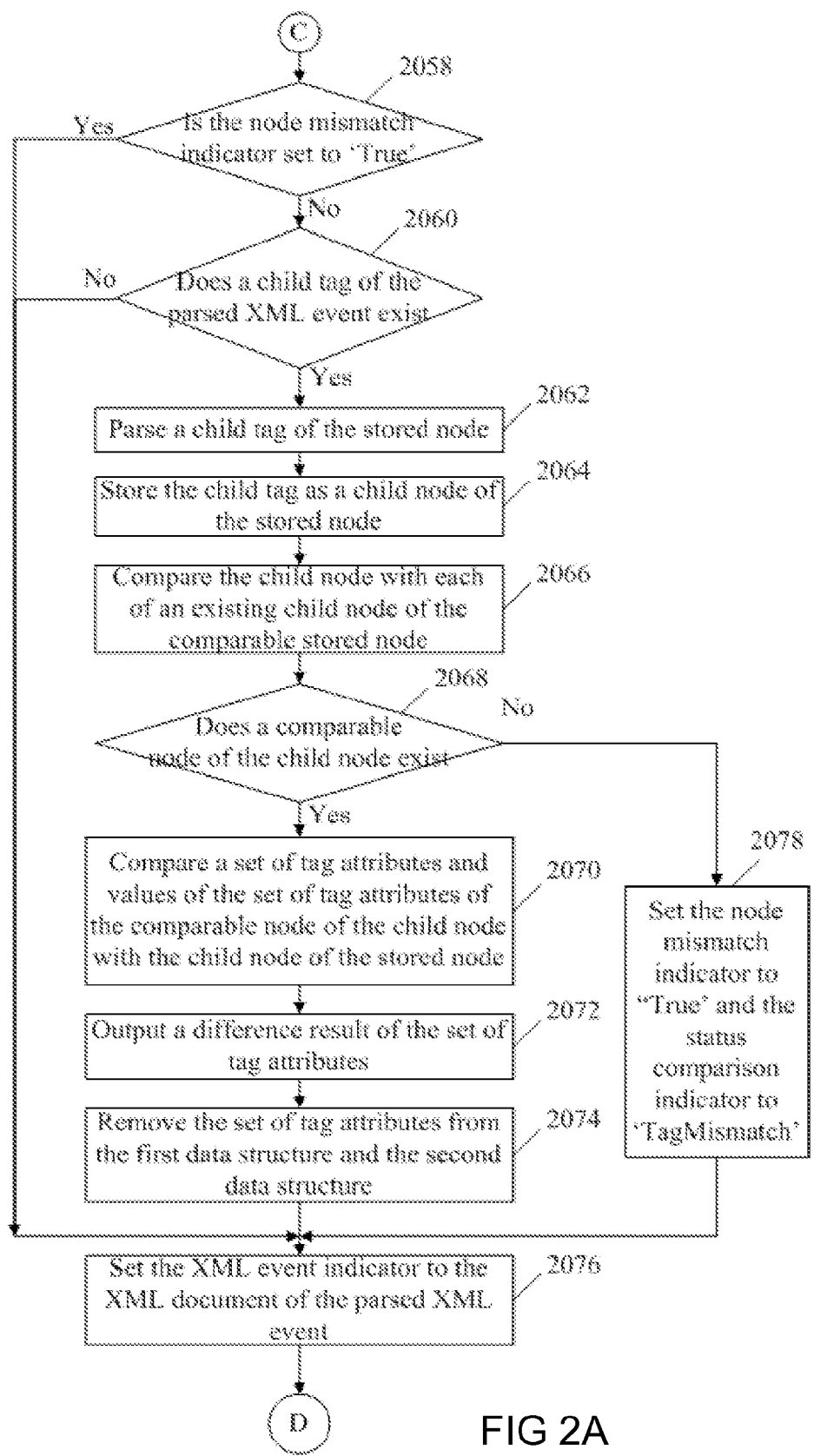
FIGS. 2A-E is a flowchart illustrating a preferred embodiment of a method of comparing a first XML document with a second XML document.
Figure 2B:
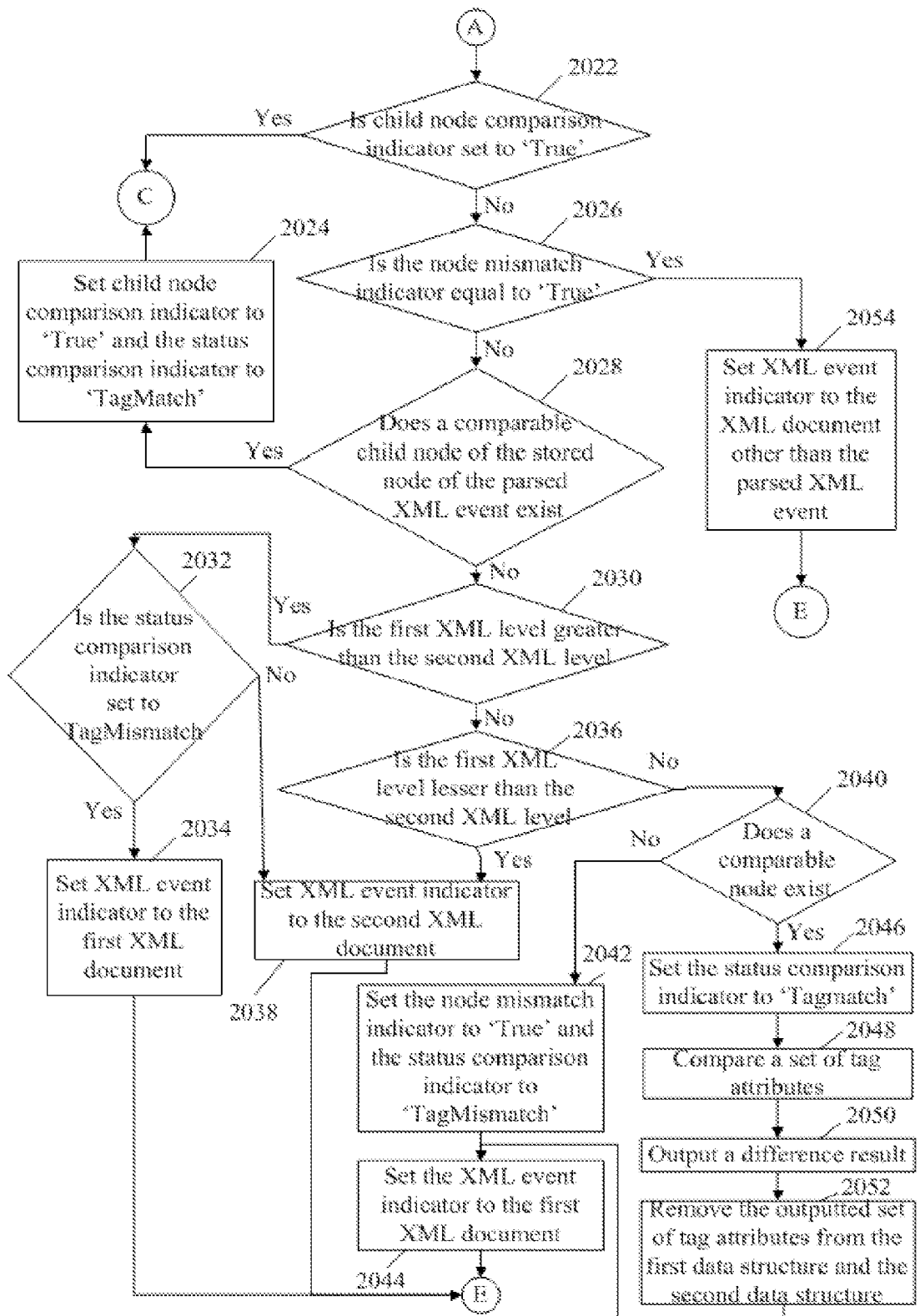
Figure 2C:
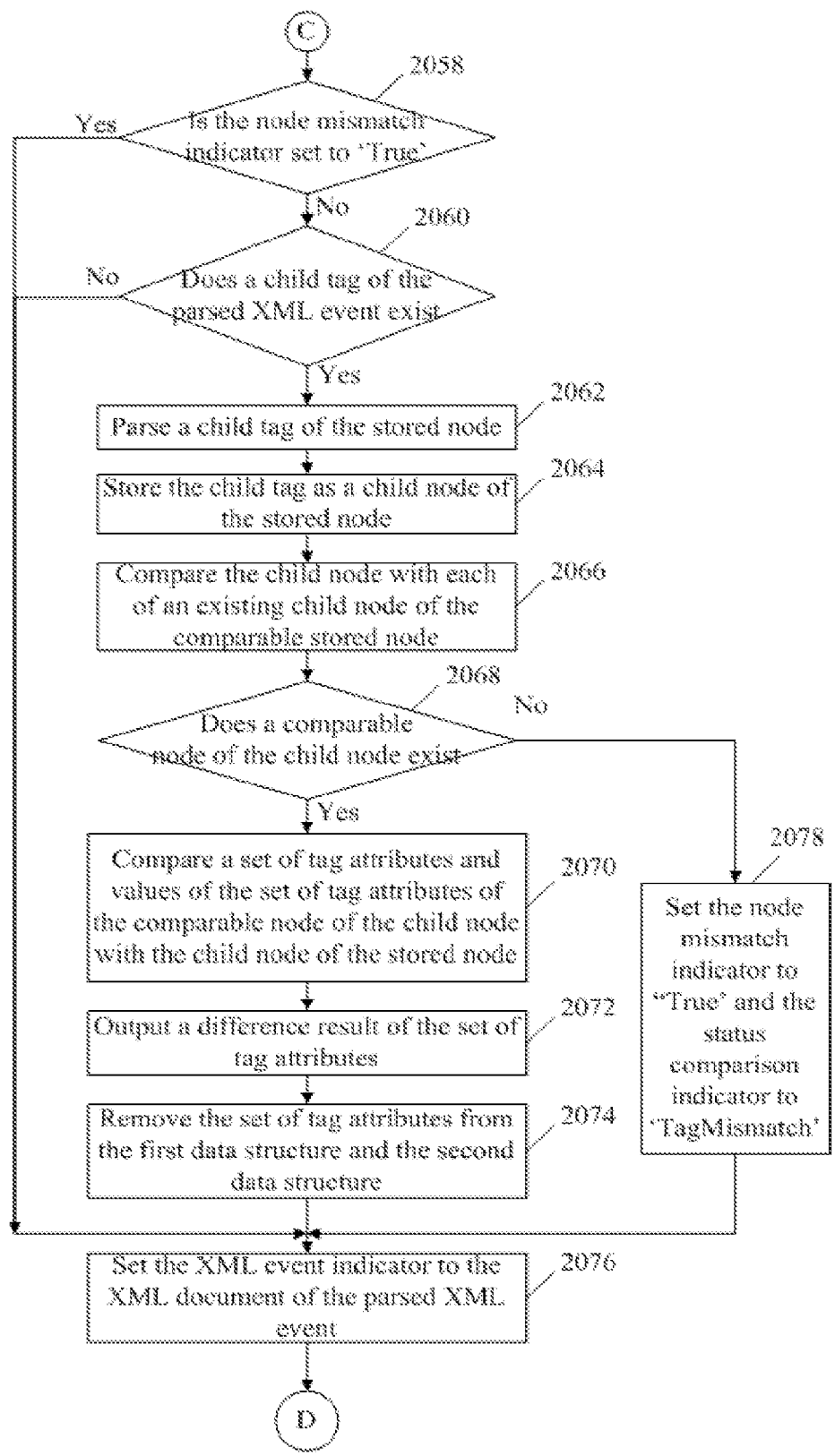
Figure 2D:
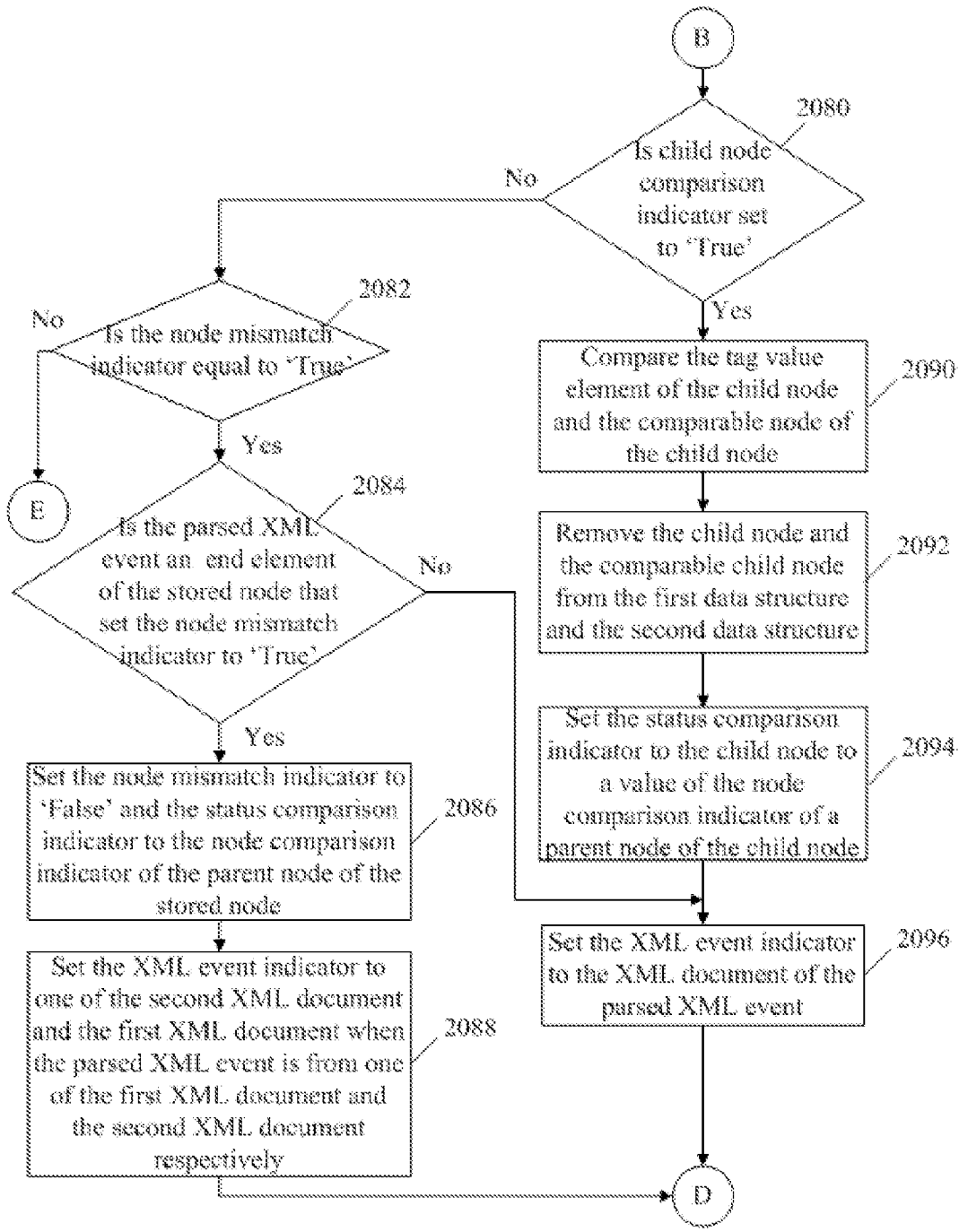
Figure 2E:
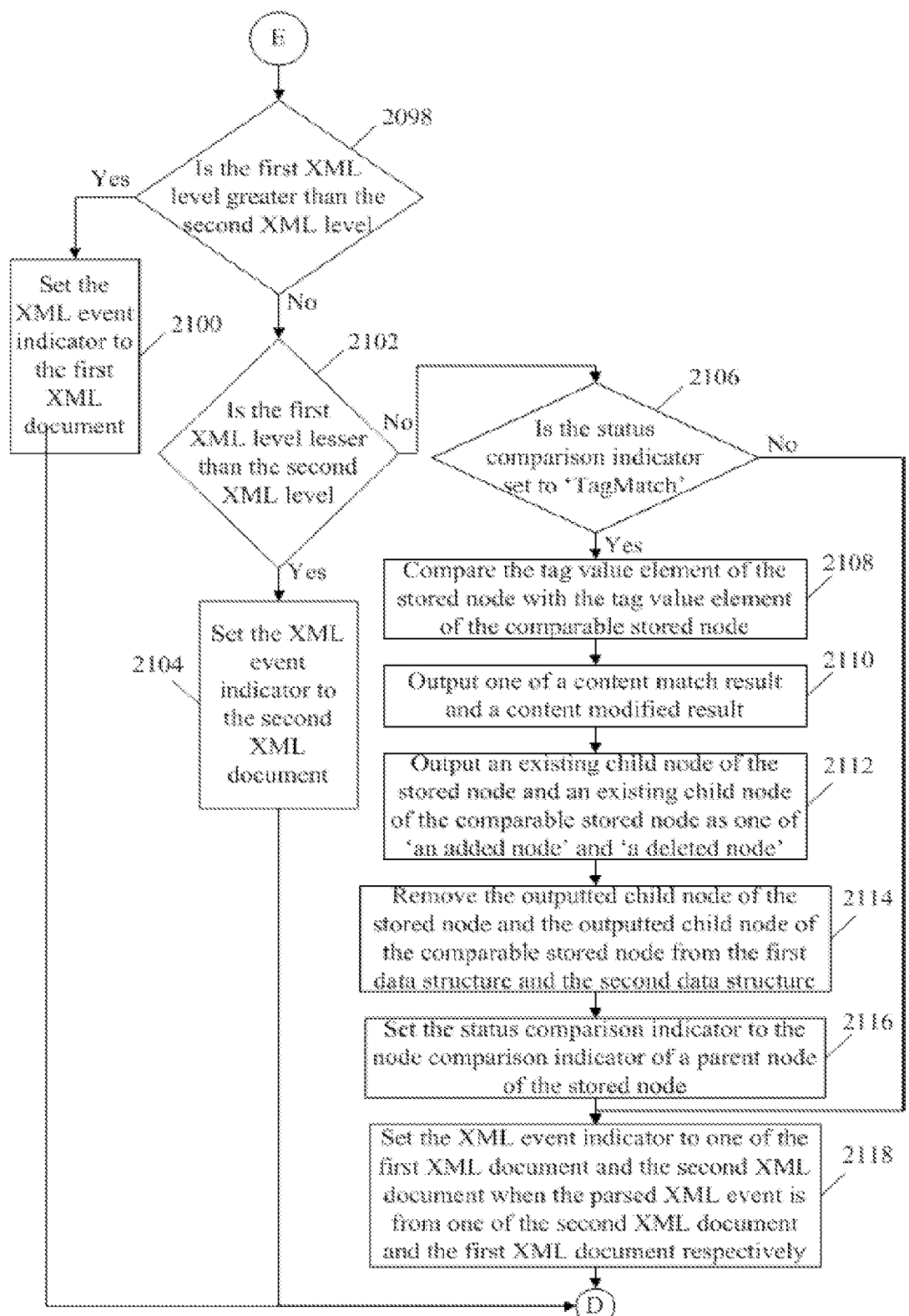

FIG. 1 is a flowchart that illustrates a method performed in comparing two XML documents viz. a first XML document with a second XML document in accordance with an embodiment of the present invention. At step 102, an XML event is parsed, by one or more computing devices of a computing environment in which the present invention can be practiced, from one of the first XML document and the second XML document, when an XML event indicator is set. In the disclosed embodiment, three different XML events are defined; a start element, a tag value element, and an end element. The start element XML event is said to be parsed when a start tag is read from an XML document. The start element includes a tag name, a set of tag attributes and values of the set of tag attributes, of the start tag. The tag value element XML event is parsed when a content, characters or data from the XML document is parsed. The end element XML event is said to be parsed when an end tag from the XML document is parsed. The end element includes the tag name of the end tag. The XML event indicator is one of a plurality of parameters that indicates to the one or more computing devices, from which of the two XML documents; the XML event is to be parsed. In the disclosed embodiment, the XML event indicator can take one of the following two values; the first XML document and the second XML document. In an instance where the XML event indicator is set to the first XML document, the XML event is parsed from the first XML document, and where the XML event indicator is set to the second XML document, the XML event is parsed from the second XML document. At step 104, the parsed XML event, is stored as a node; in a first data structure or a second data structure, when the XML event is parsed from the first XML document, or the second XML document respectively. The first data structure and the second data structures can be any one of the conventionally known collection data structures such as a tree data structure. The stored node of the parsed XML event is compared with one or more nodes stored in a corresponding data structure, based on the values of the plurality of parameters at step 106. The corresponding data structure is defined as; the second data structure for a stored node of the first data structure, and as the first data structure for a stored node of the second data structure. At step 108, a comparison result is outputted, when the one or more nodes is a comparable stored node of the stored node. On outputting the comparison result, the compared and outputted stored nodes are deleted from the first data structures and the second data structures respectively, at step 110. The step of deleting ensures that the memory structures are minimally utilized, and only that portion of an XML document is kept materialized in the memory as required for future comparison purposes.

On the completion of any one of the abovementioned steps, the XML event indicator may be set based on the plurality of parameters. The setting of the XML event indicator shall trigger the step 102, as the step 102 is to be performed whenever the XML event indicator is set. As a result, one or more of the steps 102 to 110 shall be repeated iteratively till all the tags of the two XML documents are parsed. Hence, at step 112, the condition of further parsing viz. the complete parsing of the first XML document and the second XML document is checked. In the event the first document and the second XML document are parsed completely, the method of comparison gets completed and the process terminates. However, in the event, even one of the two XML documents have not been parsed completely, one or more of the steps 102 to 110 shall get repeated in successive iterations till both the XML documents are parsed completely.

In the disclosed embodiment, the plurality of parameters, on which the method of comparing the two XML documents depends, include a first XML level, a second XML level, a status comparison indicator, a node mismatch indicator, a child node comparison indicator, and a node comparison indicator for each of the nodes stored in the first data structure and the second data structure. Before initiating the method of comparing the two XML documents, the plurality of parameters are reset to an initial value. In the disclosed embodiment, but not limited to herein, the first XML level is reset to zero, the second XML level is reset to zero, the status comparison indicator is reset to 'NULL', the node mismatch indicator and the child node comparison indicator are reset to 'False' and the node comparison indicator of each node is reset to 'NULL', when storing the each node for a first time. The first XML level and the second XML level refer to the depth in hierarchy up to which the first XML document and the second XML document have been parsed. In the disclosed embodiment, the first XML level and the second XML level are numeric integers. In the disclosed embodiment, a value of the first XML level is incremented when the parsed XML event is the start element, parsed from the first XML document, and the value of the first XML level is decremented when the parsed XML event is the end element, parsed from the first XML document. Similarly, a value of the second XML level is incremented when the parsed XML event is the start element, parsed from the second XML document, and the value of the second XML level is decremented when the parsed XML event is the end element, parsed from the second XML document. The value of the first XML level and the second XML level remains unchanged on parsing the tag value element from the first XML document and the second XML document respectively.

For instance, consider the below XML snippet from the first XML document, for an illustration of the calculation of the first XML level;

```
<country id="2">
    <city>
        Mumbai
    </city>
</country>
```

Table 1 indicates an embodiment of the first XML document that includes the aforementioned XML snippet and a calculation of the first XML level for the first XML document.

TABLE 1

| XML Text | XML Event | The first XML Level |
|---|---|---|
| <country id ="2"> | Start Element | 1 |
| <city> | Start Element | 2 |
| Mumbai | Content Element | 2 |
| </city> | End Element | 1 |
| </country> | End Element | 0 |

The value of the first XML level is set to 0 before initiating the step of parsing the first XML document. On parsing the first start tag viz. <country id="2">, the first XML level is incremented by 1, from 0, thereby reaching a numerical value of '1'. On parsing a second start tag viz. <city>, the first XML level is again incremented by 1, thereby reaching a numerical value of '2'. On parsing the tag value element viz. Mumbai, the first XML level remains unchanged at '2'. Further, one parsing a first end element of the XML snippet viz. </city>, the first XML level is decremented by 1 thereby reaching a numerical value of '1', and on parsing the last end element, the first XML level is further decremented by 1, thereby returning to '0', signifying that the entire XML snippet has been parsed. Consequently, on parsing the first XML document and the second XML document completely the first XML level and the second XML level shall return to 0.

The status comparison indicator refers to result of the step 106 of comparing, where the step 106 was performed in one iteration prior to a current iteration. The status comparison indicator is set to 'TagMatch', when stored node of the step 106 is compared with a comparable stored node. A comparable stored node is a node whose tag name and XML level is same as the tag name and XML level of the stored node. In an event, the stored node is compared with a node, whose tag name is dissimilar to the tag name of the stored node; the status comparison indicator is set to 'TagMismatch'. Hence, the status comparison indicator indicates whether in a last comparison, of the method, a comparable stored node of the stored node of a last parsed XML event, was found. The child comparison indicator is set to 'True', when the stored node of the parsed XML event, compares with a node stored previously in the corresponding data structure, such that the XML level of the stored node and the XML level of the node are same. When the child comparison indicator is set to 'True' the XML event indicator is iteratively set to the XML document of the parsed XML event, that set the child node comparison indicator to 'True', till the end element of the node of the parsed XML event is parsed. In each iteration, a child tag of the parsed XML event is parsed and compared with the stored child nodes of the comparable node of the stored node. On parsing the end element of the stored node, the child node comparison indicator is set to 'False' indicating, a child flow is terminated. In the disclosed embodiment, there could be instances when an XML document needs to be parsed until a particular level or a particular end tag is reached, without performing the step 106, of comparing, in such instances the node mismatch indicator is set to 'True'. In such instances, the last parsed XML is continued to be parsed until the particular end tag that set the node mismatch indicator to 'true', is parsed. The node mismatch indicator is set to the 'False', when the end element of node that set the node mismatch indicator to 'True' is parsed. An instance where the node mismatch indicator may be set to 'True', is when in a child flow, one of the child nodes of the stored node, does not compare with the existing child nodes of the comparable node. In such an instance, the child node of the stored node needs to be parsed continuously without performing the step of comparing the child nodes of the child node, till the end element of the child node is parsed. Hence, in such instances, the node mismatch indicator is set to 'True' to indicate, that only the last parsed XML event would be parsed continuously. The node comparison indicator of each node refers to the result of the step 106, of comparing, of each of the node. In the disclosed embodiment, when the child flow is terminated, the status comparison indicator is set to the node comparison indicator of a parent node of the stored node that set the child flow. Further, in the disclosed embodiment, when the node mismatch indicator is set to 'False', the status comparison indicator is set to the node comparison indicator of a parent node of the node that set the node mismatch indicator to 'True'. The values of the plurality of indicators at any given instant of time, during the processing of the method, determines, the functioning of each of the steps 102 to 110 of the method.

FIG. 2A-E illustrates an alternate embodiment of a method of practicing the instant invention. At step 2002, a plurality of parameters, such as a first XML level and a second XML level are initiated to zero, a status comparison indicator is set to 'NULL', a child node comparison indicator and a node mismatch indicator are set to 'False' and a XML event indicator is set to a first XML document. At step 2004, an XML event is parsed from the first XML document or a second XML document, based on a value of the XML event indicator. Further, at step 2006, if the parsed XML event is verified to be a start element, the first XML or the second XML level shall be incremented by one at step 2008. The first XML level shall be incremented if the parsed XML event is from the first XML document, and the second XML level shall be incremented if the parsed XML event is from the second XML document. Further at step 2012, the parsed XML event is stored as a node in a first data structure or a second data structure if the parsed XML event is from the first XML document or the second XML document respectively. A tag name and a set of tag attributes of the start element are stored with the node. In the event the parsed XML event is an end element parsed from the first XML document or the second XML document, at step 2014, the first XML level or the second XML level is decremented by one respectively. In the event the parsed XML event is a tag value element, data associated with the tag value element is stored as a parameter of the node of the parsed XML event and the XML event indicator is set to a XML document of the parsed XML event, at step 2018.

Further, in the event the parsed XML event is a start element, at step 2022, the status of the child node comparison indicator shall be checked, to verify whether, the parsing needs to continue in a child flow. In the event the child comparison indicator is not set to 'True', at step 2028, conditions for setting the child comparison indicator to 'True' are checked. In the event a comparable child node of the stored node exists, having an XML level same as the XML level of the stored node, the child comparison indicator is set to 'True' and the status comparison indicator is set to 'Tagmatch' at step 2024. In the event the comparable child node does not exist, at step 2030, first XML level is checked with respect to the second XML level. In the event the first XML level is greater than the second XML level, and the status comparison indicator is set to 'TagMismatch', the XML event indicator is set to the first XML document, at step 2034. In the event the first XML level is lesser than the second XML level, at step 2038, the XML event indicator is set to the second XML document. In the event the first XML level is equal to the second XML level, at step 2040, and a comparable stored node of the stored node exists, a node comparison indicator of the stored node, a node comparison indicator of the comparable stored node and the status comparison indicator are set to 'Tagmatch', at step 2046. At step 2048, a set of tag attributes of the comparable stored node is compared with a set of tag attributes of the stored node. At step 2050, a difference result comprising the differences in the set of tag attributes and values of the set of tag attributes, is outputted. Further, at step 2052, the outputted set of tag attributes are removed from the first data structure and the second data structure. In an event, when the child node comparison indicator is set to true, at step 2024, the method further checks if the node mismatch indicator was set to 'True' in a previous iteration, at step 2058.

In the event the node mismatch indicator is set to 'True', the XML event indicator is set to the XML document of the parsed XML event. In the event the node mismatch indicator is not set to 'True', the method further checks, for a child tag of the stored node of the parsed XML event that set the child comparison indicator to 'True', at step 2060. Further, at step 2062, the child tag is parsed. At step 2064, the child tag is stored as a child node of the stored node. At step 2064, the child node is compared with each of an existing child node of the comparable stored node of the stored node. In the event a comparable node of the child node does not exist, at step 2078, the node mismatch indicator is set to 'True' and the status comparison indicator is set to 'TagMismatch'. Further, in the event a comparable node of the child node exists, at step 2070, a set of tag attributes of the comparable node of is compared with a set of tag attributes of the child node. At step 2072, a difference result of the set of tag attributes is outputted and at step 2074, the set of tag attributes are removed from the first data structure and the second data structure. At step 2076, the XML event indicator shall be set to the XML document of the parsed XML event. In the event, the parsed XML event is an end element, the method shall check if the child node comparison indicator was set to 'True' in a previous iteration, at step 2080. In the event, the child node comparison indicator is set to 'true', the tag value element of the child node and the comparable node of the child node are compared, at step 2090. Further, at step 2092, the child node and the comparable node are removed from the first data structure and the second data structure. In an instance, where child nodes of the child node and the comparable node exist in the first data structure and the second data structure, respectively, they are outputted as 'deleted nodes' and 'added nodes' respectively in a comparison result, and removed from the first data structure and the second data structure subsequently. At step, 2094, the status comparison indicator is set to a value of the node comparison indicator of a parent node of the child node. At step, 2096, the XML event indicator is set to the XML document of the parsed XML event. In the event the node mismatch indicator is set to true, instead of the child node comparison indicator, as determined at step 2082, the method shall check if the parsed end element is the end element of the stored node that set the node mismatch indicator to 'True'. In the event, the end element is that of the stored node that set the node mismatch indicator to 'True', at step 2086, the node mismatch indicator shall be set to 'False', and the status comparison indicator shall be set to a node comparison indicator of a parent node of the stored node. Further, at step 2088, the XML event indicator shall be set to the second XML document or the first XML document, if the parsed XML event if from one of the first XML document or the second XML document respectively. In the event the parsed end element is not the end element of the stored node that set the node mismatch indicator to 'True', the XML event indicator shall be set to the XML document of the parsed end element, as in step 2096.

Alternatively, if on parsing the end element, as determined at step 2010, the child node comparison indicator and the node mismatch indicator are determined to be set to 'False', the method shall follow a normal logic. At step 2100, the XML event indicator shall be set to the first XML document, if the first XML level is greater than the second XML level. In the event the first XML level is less than the second XML level, the XML event indicator shall be set to the second XML document, at step 2104. In the event the first XML level is equal to the second XML level, and the status comparison indicator is set to 'TagMatch', at step 2108, the tag value element of the stored node of the end element is compared with the tag value element of the comparable stored node. At step 2110, a content match result is outputted if the tag value element of the stored node matches with the tag value element of the comparable stored node, and a content modified result is outputted if the tag value element of the stored node differs from the tag value element of the comparable stored node. At step 2112, an existing child node of the stored node is outputted as an 'added node' or a 'deleted node' if the stored node is from the second data structure or the first data structure respectively. Similarly, an existing child node of the comparable stored node is outputted an 'added node' or a 'deleted node' if the stored node is from the second data structure or the first data structure respectively. At step 2114, the outputted child nodes, the stored node, and the comparable stored node are removed from the first data structure and the second data structure. At step 2116, the status comparison indicator can be set to the value of the node comparison indicator of a parent node of the stored node. At step 2118, the XML event indicator is set to one of the first XML document and the second XML document when the parsed XML event is from one of the second XML document and the first XML document respectively. In the event, at step 2106, the status comparison indicator is determined to be equal to 'TagMismatch', the control passes to step 2118, where the XML event indicator is set to the first XML document or the second XML document, when the parsed XML event is from the second XML document or the first XML document respectively.

In the disclosed embodiment, whenever the step of setting the XML event indicator are executed, the control of the method shall go to step 2004, thereby beginning another iteration by the step of parsing an XML event. However, the control shall loop back to step 2004, provided, at step 2020, the first XML level and the second XML level have not equated to zero. When the first XML level and the second XML level equate to zero, it signifies that the first XML document and the second XML document have been parsed and compared completely, and hence the method of comparing the two XML documents is completed.

Figure 3:
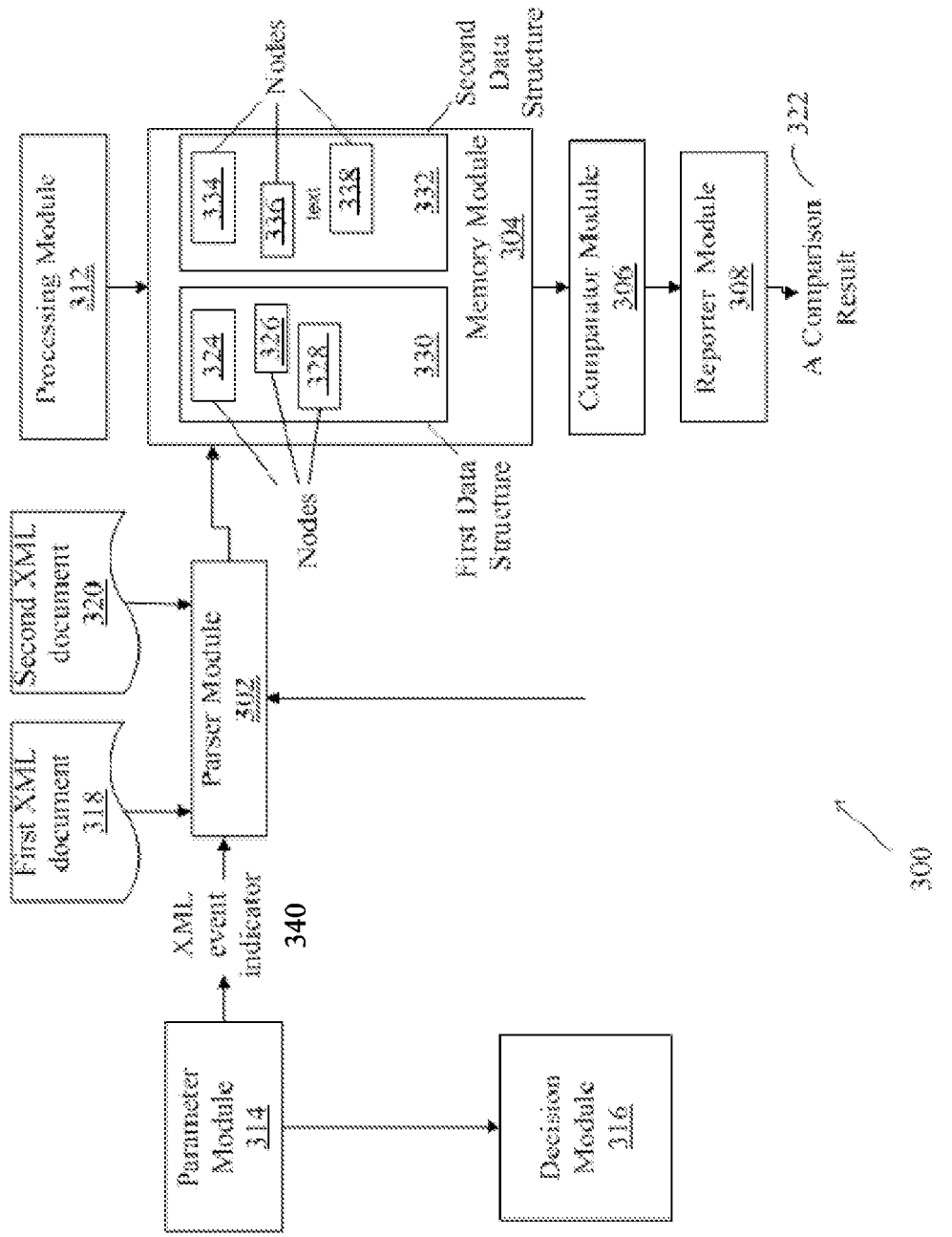
FIG. 3 shows an exemplary system for comparing a first XML document with a second XML document.

FIG. 3 illustrates an exemplary system 300 in which various embodiments of the invention can be practiced. The exemplary system 300 includes a parameter module 314, a decision module 316, a parser module 302, a processing module 312, a memory module 304, a comparator module 306, and a reporter module 308 for a process of comparing a first XML document 318 with a second XML document 320.

The parameter module 314, can be configured to set a plurality of parameters, based on which, essential steps for comparing the first XML document 318, with the second XML document 320 may be processed by the system 300. The plurality of parameters includes a XML event indicator 340, a status comparison indicator, a first XML level, a second XML level, a node mismatch indicator, a child node comparison indicator, and a node comparison indicator. In an embodiment of the present invention, the XML event indicator 340, can serve as an input to the parser module 302, indicating to the parser module 302, from which of the first XML document 318 and the second XML document 320, an XML event can be parsed at any given instant during the process of comparing. Further, in the disclosed embodiment, the parser module 302, can be configured to perform the step of parsing, whenever, the XML event indicator 340, is set by the parameter module 314. The memory module 304 includes a first data structure 330 and a second data structure 332, which are configured to store the XML event parsed from the parser module 302 as nodes 324, 326, 328, 334, 336, and 338. The XML event that is parsed from the first XML document 318, can be stored as a node such as 324, 326 or 328 in the first data structure 330, and the XML event that is parsed from the second XML document 320, can be stored as a node such as 334, 336 and 338, in the second data structure 332. The comparator module 306, can compare nodes such as 324, 326, and 328 of the first data structure 330, with the nodes such as 334, 336 and 338 of the second data structure 332 based on the plurality of parameters. The reporter module 308, shall output a comparison result 322, when in an instance, a node such as 338 of a data structure such as the second data structure 332 is a comparable node of a node such as 328 of a corresponding data structure such as the first data structure 330. In the aforementioned instance, the node 338 is said to be a comparable node of the node 328, when a tag name and a XML level of the node 338 is same as a tag name and a XML level of the node 328. The XML level refers to the depth in hierarchy of the node 328 within the second XML document. In an embodiment, the parameters such the child node comparison indicator, the status comparison indicator, and the node mismatch indicator, as set by the parameter module 314, during the process of comparing, can be referred to by the comparator module 306, while performing the step of comparing. The reporter module 308 can be configured to output a comparison result 322, when the comparable node is compared with the node of the corresponding data structure. For instance, the comparison result 322 can include a content match result when a tag value element of the node 328 is equal to a tag value element of the node 332, or a content modified result when the tag value element of the node 328 differs from the tag value element of the node 338. Further, a child node of the node 328 if present in the first data structure 330, while outputting the comparison result 322 of the node 328, shall be outputted as a 'deleted node', and a child node of the node 338 if present in the second data structure 338, shall be outputted in the comparison result 322 as an 'added node'. On outputting the comparison result 322, the nodes in the given instance 328 and 338, shall be deleted from the first data structure 330 and the second data structure 332, respectively, by the processing module 312. A step of deleting, by the processing module 312, ensures, minimum utilization of the memory module 304, thereby increasing the efficiency of the process of comparing, when the first XML document 318 and the second XML document 320 increase in size.

Aforementioned steps of parsing, storing, comparing, outputting and deleting shall be repeated in a number of iterations for each tag of the first XML document 318 and the second XML document 320, till each tag is parsed. The decision module 316 can be configured to determine when the process of comparing shall terminate. In the disclosed embodiment, when the first XML document 318 and the second XML document 320 are parsed and compared completely, the process of comparing shall be completed. In order to determine whether an XML document has been parsed completely, the parameter module 314 can be configured to set the first XML level and the second XML level as parameters for the first XML document 318 and the second XML document 320 respectively. The first XML level and the second XML level can be numerical integers, and initialized to zero while performing the step of parsing for a first time of an XML document, in the disclosed embodiment. For instance, the first XML level can be incremented by one when, a start element XML event is parsed and decremented when an end element XML event is parsed. Hence, when the first XML document 318 is parsed completely, the first XML level shall return to the initiated value of zero, thereby signifying to the decision module 316, that the first XML document 318 has been parsed completely. Similarly when the second XML level, returns to zero, it shall signify that the second XML document 320 has been parsed completely. Consequently, when both the first XML level and the second XML level return to zero, the decision module 316 that takes the first XML level and the second XML level as inputs from the parameter module 314 shall conclude that the first XML document and the second XML document have been parsed completely and the process of comparing is complete. Hence, the decision module 316 shall indicate to the parser module 302, to terminate the step of parsing.

Figure 4:
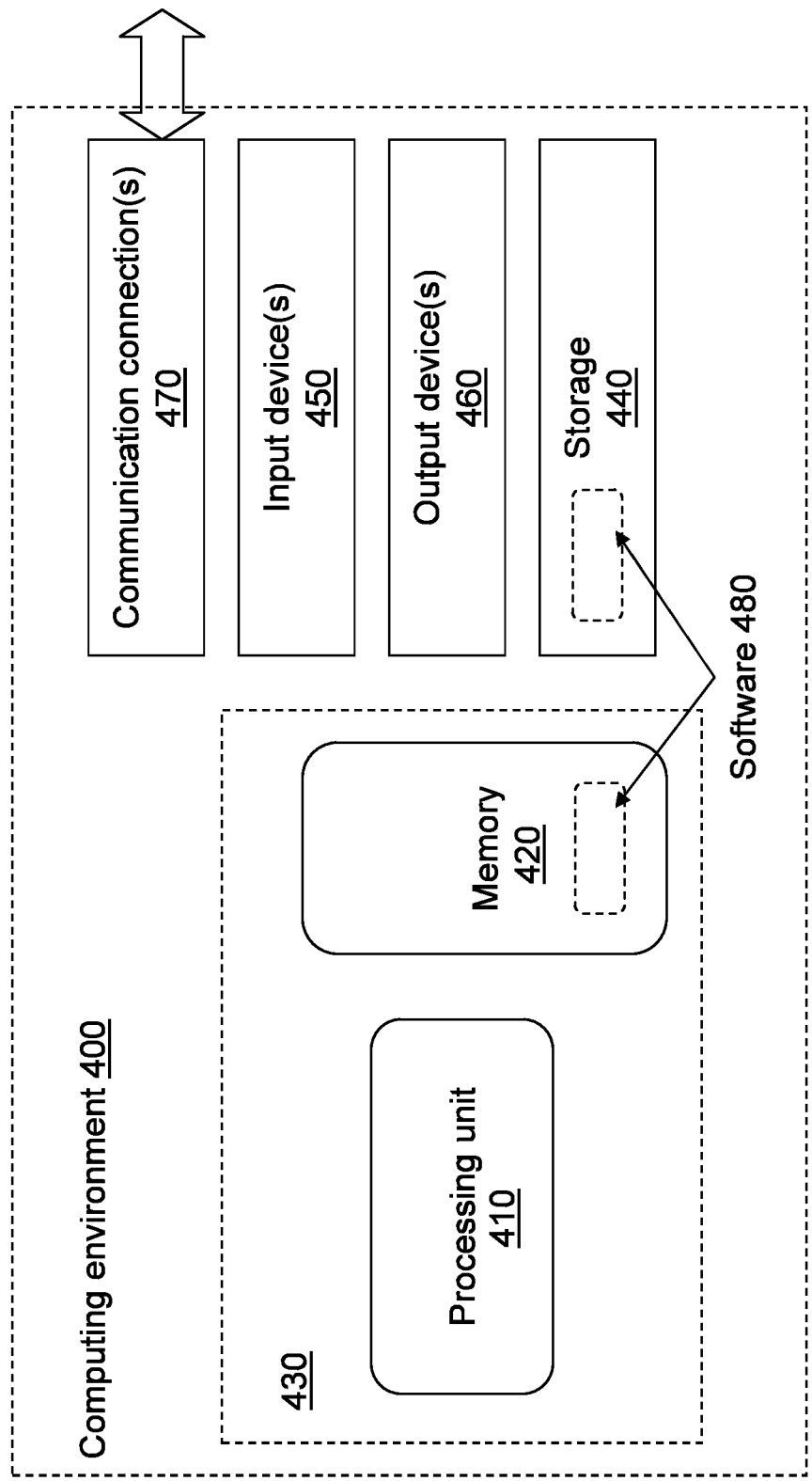
FIG. 4 illustrates a generalized example of a computing environment 400.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 440, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

What is claimed is:

1. A method for comparing a first XML document with a second XML document comprising:
   a) parsing, by a computing device, an XML event from the first XML document or the second XML document when an XML event indicator is set, wherein the parsed XML event comprises a start element, the tag value element, and an end element;
   b) storing, by the computing device, the parsed XML event and storing data associated with a tag value element of the parsed XML event as a node in a first data structure or a second data structure, when the parsed XML event is from the first XML document or the second XML document, respectively, the storing further comprising storing, a tag name, a set of tag attributes, and values of the set of tag attributes of the parsed XML event in in the first data structure or the second data structure when the parsed XML event is the start element parsed from the first XML document or the second XML document;
   c) comparing, by the computing device, the stored node of the parsed XML event with one or more nodes stored in the first data structure or the second data structure, based on the parsed XML event and a plurality of parameters wherein the comparing further comprises comparing the tag name of the stored node of the parsed XML event with the tag name of a node stored in the second data structure or the first data structure, when the parsed XML event is the start element from the first XML document or the second XML document and wherein setting a node comparison indicator of the stored node of the parsed XML event, the node comparison indicator of the node, and the a comparison indicator to 'TagMatch', when the tag name of the stored node of the parsed XML event is equal to the tag name of the node and setting the node comparison indicator of the stored node of the parsed XML event, the node comparison indicator of the node, the status comparison indicator to "TagMismatch", and the node mismatch indicator to 'True', when the taq name of the stored node of the parsed XML event differs from the tag name of the node;
   d) outputting, by the computing device, a comparison result, based on the parsed XML event and the plurality of parameters, when a node in the one or more nodes stored in the first data structure or the second data structure is a comparable stored node of the stored node of the parsed XML event;
   e) deleting, by the computing device, the compared stored nodes from the first data structure and the second data structure, based on the parsed XML event and the plurality of parameters, when the compared stored nodes are outputted in the comparison result;
   f) setting, by the computing device, the XML event indicator to the first XML document or the second XML document on processing the step of parsing, the step of storing, the step of comparing, the step of outputting a comparison result, or the step of deleting, based on the plurality of parameters, performing the step (f), whereby the XML event indicator is set to the first XML document; and g) repeating steps (a) through (e) or step (f) in each iteration, until the first XML document and the second XML document are parsed completely.

2. The method of claim 1, wherein the compared stored nodes are stored in a previous iteration and a current iteration and compared in the previous iteration and the current iteration.

3. The method of claim 2, wherein the plurality of parameters comprise a first XML level, a second XML level, a status comparison indicator, a node mismatch indicator, a child node comparison indicator, or a node comparison indicator of each of the nodes.

4. The method of claim 3, wherein the plurality of parameters are reset to 'zero', 'Null', 'False' or the first XML document.

5. The method of claim 3, wherein the first XML level and the second XML level refer to a depth in hierarchy of the first XML document and the second XML document, respectively.

6. The method of claim 3, wherein the node comparison indicator is stored as a parameter of each node of the first data structure and each node of the second data structure.

7. The method of claim 1, wherein the first data structure and the second data structure are intermediate node tree structures.

8. The method of claim 4, wherein the value of the first XML level or the second XML level is:
incremented when the parsed XML event is a start element parsed from the first XML document or the second XML document, respectively; and
decremented when the parsed XML event is the end element parsed from the first XML document or the second XML document, respectively.

9. The method of claim 1, wherein the comparable stored node of a node in the first data structure or the second data structure is a stored node of the second data structure or the first data structure, respectively, whereby the tag name and XML level of the comparable stored node and the node are equal.

10. The method of claim 9, wherein the step of comparing the stored node of the parsed XML event, comprises:
the child node comparison indicator and the node mismatch indicator are "False"; and
the first XML level equals the second XML level, whereby the XML level of the node and the stored node of the parsed XML event are equal.

11. The method of claim 1, further comprising, when the node mismatch indicator is set to 'True':
performing the step (g), wherein the steps (a), (b), and (f) are repeated in each iteration, whereby in the step (f), the XML event indicator is set to the XML document of the parsed XML event that set the node mismatch indicator to 'True', until the end element of the stored node is parsed;
setting, by the computing device, the node mismatch indicator to 'False', and the status comparison indicator to a value of a node comparison indicator of a parent node of the stored node of the parsed XML event, when the end element of the stored node is parsed; and
performing, the step (f), whereby the XML event indicator is set to the second XML document or the first XML document, when the end element of the stored node is parsed from the first XML document or the second XML document, respectively.

12. The method of claim 1, further comprising, when the tag name of the stored node of the parsed XML event is equal to the tag name of the node:
comparing, by the computing device, the set of tag attributes and values of the set of tag attributes of the stored node of the parsed XML event with the set of tag attributes and values of the set of tag attributes of the node;
outputting, by the computing device, a difference result comprising differences in the set of tag attributes and the values of the set of tag attributes of the stored node of the parsed XML event and the set of tag attributes and the values of the set of tag attributes of the node; and
removing, by the computing device, the outputted set of tag attributes of the stored node of the parsed XML event and the outputted set of tag attributes of the node from the first data structure and the second data structure after the difference result is outputted.

13. The method of claim 1, wherein performing the step (f), when the parsed XML event is the start element, further comprises:
setting, by the computing device, the XML event indicator to the first XML document, when the value of the first XML level is greater than the value of the second XML level and the value of the status comparison indicator equals "TagMismatch";
setting, by the computing device, the XML event indicator to the second XML document, when the value of the first XML level is greater than the value of the second XML level, and the value of the status comparison indicator equals "TagMatch" or "NULL"; and
setting, by the computing device, the XML event indicator to the second XML document, when the value of first XML level is lesser than the value of the second XML level.

14. The method of claim 9, wherein the step of comparing further comprises:
comparing, by the computing device, the tag value element of the stored node of the parsed XML event with the tag value element of a comparable stored node of the stored node, when the parsed XML event is an end element of the stored node, and the first XML level is equal to the second XML level.

15. The method of claim 14, wherein the step of outputting a comparison result further comprises providing as output in the comparison result:
a content match result, when the tag value element of the stored node of the parsed XML event is equal to the tag value element of the comparable stored node;
a content modified result, when the tag value element of the stored node of the parsed XML event differs from the tag value element of the comparable stored node;
a child node of the stored node of the parsed XML event, as "a deleted node" or "an added node", when the stored node is from the first data structure or the second data structure, respectively; and
a child node of the comparable stored node, as "an added node" or "a deleted node", when the comparable stored node is stored in the second data structure or the first data structure, respectively.

16. The method of claim 15, wherein the step of deleting further comprises:
removing, by the computing device, after outputting the comparison result, the child node of the stored node, the stored node, the child node of the comparable stored node, and the comparable stored node from the first data structure and the second data structure;

setting, by the computing device, the value of the status comparison indicator to the value of the node comparison indicator of a parent node of the stored node of the parsed XML event; and performing the step (f), whereby the XML event indicator is set to the first XML document or the second XML document when the parsed XML event is parsed from the second XML document or the first XML document, respectively.

17. The method of claim 1, wherein performing the step (f) further comprises:

setting, by the computing device, the XML event indicator to the first XML document, when the first XML level is greater than the second XML level; and the parsed XML event is the end element;

setting, by the computing device, the XML event indicator to the second XML document, when the first XML level is lesser than the second XML level; and the parsed XML event is the end element; and setting, by the computing device, the XML event indicator to the first XML document or the second XML document, when the parsed XML event is the tag value element, parsed from the first XML document or the second XML document, respectively.

18. The method of claim 1, wherein the step of comparing the stored node of the parsed XML event with one or more nodes stored in the first data structure or the second data structure further comprises:

setting, by the computing device, the child node comparison indicator to "True" and the status comparison indicator to "TagMatch", when a comparable stored node of the stored node of the parsed XML event exists, the parsed XML event is the start element, and the node mismatch indicator is set to "False";

comparing, by the computing device, the set of tag attributes and the values of the set of tag attributes of the comparable stored node with the set of tag attributes and the values of the set of tag attributes of the stored node of the parsed XML event, when the child node comparison indicator is set to "True";

outputting, by the computing device, a difference result comprising differences in the set of tag attributes and the values of the set of tag attributes of the comparable stored node and the stored node of the parsed XML event;

removing, by the computing device, the outputted set of tag attributes of the comparable stored node and the outputted set of tag attributes of the stored node from the first data structure and the second data structure after the difference result is outputted; and performing the step (f), whereby the XML event indicator is set to the XML document of the parsed XML event.

19. The method of claim 18, further comprising, when the child node comparison indicator is set to 'True', performing the step (g), whereby in the step (f), the XML event indicator set to the XML document of the parsed XML event in each iteration, until the end element of the stored node of the parsed XML event, that set the child comparison indicator to 'True', is parsed.

20. The method of claim 19, wherein an iteration further comprises:

parsing a start element of a child tag of the parsed XML event;

storing the parsed child tag as a child node of the stored node;

comparing the child node with each of an existing child node of the comparable stored node of the stored node of the parsed XML event;

providing as output differences in the set of tag attributes and the values of the set of tag attributes of the child node of the stored node of the parsed XML event and one of the existing child nodes, when the one of the existing child nodes is a comparable stored node of the child node of the stored node; and removing the outputted set of tag attributes of the comparable child nodes from the first data structure and the second data structure.

21. The method of claim 20, wherein a successive iteration, comprises:

parsing, by the computing device, an end element of the child node of the stored node of the parsed XML event;

providing, by the computing device, as output a difference in the tag value element of the child node of the stored node and the tag value element of the comparable child node of the comparable stored node;

removing, by the computing device, the child node of the stored node and the comparable child node of the comparable stored node from the first data structure and the second data structure; and setting, by the computing device, value of the status comparison indicator to a value of a node comparison indicator of a parent node of the child node.

22. The method of claim 21, wherein a successive iteration comprises:

parsing, by the computing device, an end element of the stored node of the parsed XML event, that set the child comparison indicator to 'True';

outputting, by the computing device, an existing child node of the stored node of the parsed XML event, as a "deleted node" or "an added node", when the stored node is from the first data structure or the second data structure, respectively, and a comparable stored node of the existing child node does not exist;

outputting, by the computing device, an existing child node of the comparable stored node as "an added node" or a "deleted node" when the comparable stored node is from the second data structure or the first data structure, respectively, and a comparable stored node of the existing child node does not exist;

removing, by the computing device, the outputted child node of the stored node, the stored node, the outputted child node of the comparable stored node, and the comparable stored node from the first data structure or the second data structure; and setting, by the computing device, a value of the status comparison indicator to a value of a node comparison indicator of a parent node of the stored node and setting the child node comparison indicator to 'False'.

23. The method of claim 22, further comprising:

performing, by the computing device, the step (f), whereby the XML event indicator is set to the second XML document or the first XML document, when the parsed XML event is from the first XML document or the second XML document, respectively.

24. The method of claim 20, further comprising, when a comparable stored node of the child node of the stored node does not exist:

setting, by the computing device, the node mismatch indicator to 'True', and the status comparison indicator to 'TagMismatch'; and performing the step (g), wherein the steps (a), (b) and (f) are repeated in each iteration, whereby in the step (f), the XML event indicator is set to the XML document of the parsed XML event, until the end element of the child node is parsed.

25. The method of claim 24, further comprising:
setting, by the computing device, the node mismatch indicator to 'False', and the status comparison indicator to the value of the node comparison indicator of a parent node of the child node; and
performing the step (f), whereby the XML event indicator is set to the second XML document or the first XML document, when the end element of the child node that set the node mismatch indicator to 'True', is parsed from the first XML document or the second XML document, respectively.

26. A computing device comprising:
a processor;
a memory, wherein the memory coupled to the processor which are configured to execute programmed instructions stored in the memory comprising:
a) parsing an XML event from the first XML document or the second XML document when an XML event indicator is set, wherein the parsed XML event comprises a start element, the tag value element, and an end element;
b) storing the parsed XML event and storing data associated with a tag value element of the parsed XML event as a node in a first data structure or a second data structure, when the parsed XML event is from the first XML document or the second XML document, respectively, the storing further comprising storing, a tag name, a set of tag attributes, and values of the set of tag attributes of the parsed XML event in in the first data structure or the second data structure when the parsed XML event is the start element parsed from the first XML document or the second XML document;
c) comparing the stored node of the parsed XML event with one or more nodes stored in the first data structure or the second data structure, based on the parsed XML event and a plurality of parameters wherein the comparing further comprises comparing the tag name of the stored node of the parsed XML event with the tag name of a node stored in the second data structure or the first data structure, when the parsed XML event is the start element from the first XML document or the second XML document, and wherein
setting the node comparison indicator of the stored node of the parsed XML event, the node comparison indicator of the node, and the status comparison indicator to Taq-Match, when the taq name of the stored node of the parsed XML event is equal to the taq name of the node and setting the node comparison indicator of the stored node of the parsed XML event, the node comparison indicator of the node, the status comparison indicator to TagMismatch, and the node mismatch indicator to 'True', when the tag name of the stored node of the parsed XML event differs from the tag name of the node;
d) outputting a comparison result based on the parsed XML event and the plurality of parameters, when a node in the one or more nodes stored in the first data structure or the second data structure is a comparable stored node of the stored node of the parsed XML event;
e) deleting the compared stored nodes from the first data structure and the second data structure, based on the parsed XML event and the plurality of parameters, when the compared stored nodes are outputted in the comparison result;
f) setting the XML event indicator to the first XML document or the second XML document on processing the step of parsing, the step of storing, the step of comparing, the step of outputting a comparison result, or the step of deleting, based on the plurality of parameters, performing the step (f), whereby the XML event indicator is set to the first XML document; and
g) repeating, the steps (a) through (e), or the step (f), in each iteration, until the first XML document and the second XML document are parsed completely.

27. The device of claim 26, wherein the plurality of parameters comprise a first XML level, a second XML level, a status comparison indicator, a node mismatch indicator, a child node comparison indicator, and a node comparison indicator of each of the nodes.

28. The device of claim 27, further comprising resetting the plurality of parameters to 'zero', 'Null', 'False', or the first XML document.

29. The device of claim 26, further comprising:
storing the node comparison indicator as a parameter of a node of the first data structure, when storing the node and a node of the second data structure.

30. The device of claim 26, further comprising:
incrementing the value of the first XML level or the second XML level by one, when the parsed XML event is a start element parsed, from the first XML document or the second XML document, respectively; and
decrementing the value of the first XML level or the second XML level by one, when the parsed XML event is the end element parsed from the first XML document or the second XML document, respectively.

31. The device of claim 26, wherein the comparable stored node of a node in the first data structure or the second data structure is a stored node of second data structure or the first data structure, respectively, whereby the tag name and XML level of the comparable stored node and the node are equal.

32. The device of claim 26 further comprising:
setting the status comparison indicator is set to 'TagMismatch', when the node with which the stored node of the parsed XML event is compared is not the comparable stored node; and
setting the status comparison indicator is set to 'TagMatch', when the node with which the stored node of the parsed XML event is compared is the comparable stored node of the stored node of the parsed XML event.

33. The device of claim 32 further comprising:
setting the XML event indicator to the first XML document, when the value of the first XML level is greater than the value of the second XML level, the parsed XML event is the start element, and the value of the status comparison indicator equals "TagMismatch";
setting the XML event indicator to the second XML document, when the value of the first XML level is greater than the value of the second XML level, the parsed XML event is the start element, and the value of the status comparison indicator equals "TagMatch" or "NULL"; and
setting the XML event indicator to the second XML document, when the value of first XML level is lesser than the value of the second XML level and the parsed XML event is the start element.

34. The device of claim 33, wherein the comparing further comprises
the child node comparison indicator and the node mismatch indicator are "False", and the first XML level equals the second XML level, whereby the XML level of the node and the stored node of the parsed XML event are equal.

35. The device of claim 26 further comprising comparing the tag value element of the stored node of the parsed XML event with the tag value element of a comparable stored node of the stored node of the parsed XML event, when the parsed XML event is the end element of the stored node and the first XML level is equal to the second XML level.

36. The device of claim 35 further comprising outputting a comparison result, by providing as output in the comparison result, when the parsed XML event is the end element of the stored node:
- a content match result when the tag value element of the stored node of the parsed XML event is equal to the tag value element of the node;
- a content modified result when the tag value element of the stored node of the parsed XML event differs from the tag value element of the node;
- a child node of the stored node of the parsed XML event, as "a deleted node" or "an added node", when the stored node is from the first data structure or the second data structure, respectively; and
- a child node of the node, as "an added node" or "a deleted node", when the node is stored in the second data structure or the first data structure, respectively.

37. The device of claim 36, wherein the deleting, when the parsed XML event is the end element of the stored node, further comprises:
- removing, after outputting the comparison result, the child node of the stored node and the stored node, the child node of the node, and the node from the first data structure and the second data structure;
- setting the value of the status comparison indicator to the value of the node comparison indicator of a parent node of the stored node of the parsed XML event; and
- performing the step (f), whereby the XML event indicator is set to the first XML document or the second XML document when the parsed XML event is parsed from the second XML document or the first XML document, respectively.

38. The device of claim 26, further comprising:
- setting the XML event indicator to the first XML document, when the first XML level is greater than the second XML level and the parsed XML event is the end element;
- setting the XML event indicator to the second XML document, when the first XML level is lesser than the second XML level and the parsed XML event is the end element; and
- setting the XML event indicator to the first XML document or the second XML document, when the parsed XML event is the tag value element and is parsed from the first XML document or the second XML document, respectively.

39. A non-transitory computer readable medium having stored thereon instructions for comparing a first XML document with a second XML document comprising machine executable code which when executed by at least one processor, causes the processor to perform steps comprising a) parsing an XML event from the first XML document or the second XML document when an XML event indicator is set, wherein the parsed XML event comprises a start element, the tag value element, and an end element;
b) storing the parsed XML event and storing data associated with a tag value element of the parsed XML event as a node in a first data structure or a second data structure, when the parsed XML event is from the first XML document or the second XML document, respectively, the storing further comprising storing, a tag name, a set of tag attributes, and values of the set of tag attributes of the parsed XML event in the first data structure or the second data structure when the parsed XML event is the start element parsed from the first XML document or the second XML document;
c) comparing the stored node of the parsed XML event with one or more nodes stored in the first data structure or the second data structure, based on the parsed XML event and a plurality of parameters wherein the comparing further comprises comparing the tag name of the stored node of the parsed XML event with the tag name of a node stored in the second data structure or the first data structure, when the parsed XML event is the start element from the first XML document or the second XML document and wherein
setting the node comparison indicator of the stored node of the parsed XML event, the node comparison indicator of the node, and the status comparison indicator to TagMatch, when the tag name of the stored node of the parsed XML event is equal to the tag name of the node and setting the node comparison indicator of the stored node of the parsed XML event, the node comparison indicator of the node, the status comparison indicator to TagMismatch, and the node mismatch indicator to 'True', when the tag name of the stored node of the parsed XML event differs from the tag name of the node;
d) outputting a comparison result, based on the parsed XML event and the plurality of parameters, when a node in the one or more nodes stored in the first data structure or the second data structure is a comparable stored node of the stored node of the parsed XML event;
e) deleting the compared stored nodes from the first data structure and the second data structure, based on the parsed XML event and the plurality of parameters, when the compared stored nodes are outputted in the comparison result;
f) setting the XML event indicator to the first XML document or the second XML document on processing the step of parsing, the step of storing, the step of comparing, the step of outputting a comparison result, or the step of deleting, based on the plurality of parameters, performing the step (f), whereby the XML event indicator is set to the first XML document; and
g) repeating, the steps (a) through (e) or the step (f), in each iteration, until the first XML document and the second XML document are parsed completely.

* * * * *